(12) United States Patent
Subburaj et al.

(10) Patent No.: US 10,429,515 B2
(45) Date of Patent: Oct. 1, 2019

(54) METHOD AND APPARATUS FOR GNSS SIGNAL TRACKING

(71) Applicant: TEXAS INSTRUMENTS INCORPORATED, Dallas, TX (US)

(72) Inventors: Karthik Subburaj, Bangalore (IN); Jawaharlal Tangudu, Bangalore (IN); Saurabh Khanna, Delhi (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/629,860

(22) Filed: Jun. 22, 2017

(65) Prior Publication Data

US 2017/0285173 A1     Oct. 5, 2017

Related U.S. Application Data

(63) Continuation of application No. 14/337,773, filed on Jul. 22, 2014.

(60) Provisional application No. 61/902,937, filed on Nov. 12, 2013.

(30) Foreign Application Priority Data

Jul. 30, 2013  (IN) ............................ 3407/CHE/2013

(51) Int. Cl.
*G01S 19/24*    (2010.01)
*G01S 19/29*    (2010.01)

(52) U.S. Cl.
CPC ............ *G01S 19/246* (2013.01); *G01S 19/29* (2013.01)

(58) Field of Classification Search
CPC ... G01S 19/246; G01S 19/29–30; G01S 19/24
See application file for complete search history.

*Primary Examiner* — Cassi J Galt
(74) *Attorney, Agent, or Firm* — John R. Pessetto; Charles A. Brill; Frank D. Cimino

(57) ABSTRACT

A GNSS receiver to track low power GNSS satellite signals. The GNSS receiver includes a frequency locked loop (FLL) that measures a current doppler frequency of the satellite signal. A delay locked loop (DLL) measures a current code phase delay of the satellite signal. A current operating point corresponds to the current doppler frequency and the current code phase delay of the satellite signal. A grid monitor receives the satellite signal and the current operating point, and measures a satellite signal strength at a plurality of predefined offset points from the current operating point. The FLL and the DLL are centered at the current operating point. A peak detector is coupled to the grid monitor and processes the satellite signal strengths at the plurality of predefined offset points and re-centers the FLL and the DLL to a predefined offset point with the satellite signal strength above a predefined threshold.

16 Claims, 11 Drawing Sheets

METHOD AND APPARATUS FOR GNSS SIGNAL TRACKING

CROSS REFERENCES TO RELATED APPLICATIONS

This application is a continuation of U.S. patent application Ser. No. 14/337,773 filed 22 Jul. 2014, which claims priority to U.S. Patent Application Ser. No. 61/902,937 filed 12 Nov. 2013 and from India provisional patent application No. 3407/CHE/2013 filed on Jul. 30, 2013, both of which are hereby fully incorporated herein by reference in its entirety.

TECHNICAL FIELD

Embodiments of the disclosure relate to wireless receivers and more particularly to global navigation satellite system (GNSS) receivers.

BACKGROUND

Global navigation satellite systems (GNSS) are broadly defined to include GPS (U.S.), Galileo (proposed), GLONASS (Russia), Beidou (China), IRNSS (India, proposed), QZSS (Japan, proposed) and other current and future positioning technologies using signals from satellites, with or without augmentation from terrestrial sources. Information from GNSS is being increasingly used for computing a user's positional information (e.g., a location, a speed, a direction of travel, etc.).

In GNSS, multiple satellites may be present, with each transmitting a satellite signal. A received signal at a GNSS receiver contains one or more of the transmitted satellite signals. To obtain the information from the respective transmitted signals, the GNSS receiver performs a signal acquisition/tracking procedure. More specifically, the GNSS receiver searches for the corresponding transmitted satellite signals in the received signal and, then locks onto them for subsequent tracking of the corresponding satellites to receive the satellite information.

When a GNSS receiver is turned on, it searches for satellite signals that match a known PN (pseudorandom noise) code and a carrier frequency (acquisition phase). The carrier frequency of the satellite signal and the PN code phase (phase of PN code) perceived by the GNSS receiver may vary over time due to doppler effect, which is caused by relative motion between the transmitting satellite and the GNSS receiver, and also drifts in the frequency of the clock used by the GNSS receiver to sample the PN code. A match of a known PN code and a carrier frequency in a received signal identifies the transmitting satellite. The GNSS receiver tracks the carrier doppler frequency and PN code phase of the satellite signal after they are acquired with the help of frequency locked loop (FLL), delay locked loop (DLL) and other GNSS receiver tracking circuits (tracking phase).

Typical open-sky GNSS satellite signal power level is −130 dBm. However, the GNSS satellite signal power level is less than −160 dBm while indoors and under tunnels. In good GNSS satellite signal conditions, the GNSS receiver would be able to track the GNSS satellite signal. However, if a user suddenly accelerates or the GNSS satellite signal is obstructed because of building, tunnels, sub-ways etc, then the GNSS receiver would lose track of the satellite signal. In such a case, the GNSS receiver has to again undergo the satellite signal acquisition process (acquisition phase). Modern GNSS receivers use an intensive hardware and firmware to first acquire the carrier frequency and PN code sampling phase (also called code phase) of the various visible GNSS satellite signals, and a less intensive hardware and firmware to then track the doppler effect caused variations after initial acquisition. Thus, acquisition of the GNSS satellite signal is more power intensive process than the tracking of the GNSS satellite signal. Thus, a GNSS receiver is required that can efficiently track the GNSS satellite signal even at low GNSS satellite signal power levels.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

An embodiment provides a GNSS receiver. The GNSS receiver includes a frequency locked loop (FLL) that receives a satellite signal and measures a current doppler frequency of the satellite signal. A delay locked loop (DLL) receives the satellite signal and measures a current code phase delay of the satellite signal. A current operating point corresponds to the current doppler frequency and the current code phase delay of the satellite signal. A position computation unit is coupled to the FLL and the DLL and computes a position of the GNSS receiver using the current doppler frequency and the current code phase delay. A grid monitor receives the satellite signal and the current operating point, and measures a satellite signal strength at a plurality of predefined offset points from the current operating point. The FLL and the DLL are centered at the current operating point. A peak detector is coupled to the grid monitor and processes the satellite signal strengths at the plurality of predefined offset points and re-centers the FLL and the DLL to a predefined offset point of the plurality of predefined offset points, with the satellite signal strength above a predefined threshold.

Another embodiment provides a GNSS receiver. The GNSS receiver includes a frequency locked loop (FLL), a delay locked loop (DLL) and a position computation unit coupled to the FLL and the DLL. The FLL includes a first circuit and a second circuit. The first circuit processes the satellite signal and generates a first output. The second circuit processes the satellite signal and generates a second output. A subtractor subtracts the first output from the second output and generates an error signal. A frequency loop filter generates a current doppler frequency from the error signal. The current doppler frequency is positive shifted and provided as feedback to the first circuit and the current doppler frequency is negative shifted and provided as feedback to the second circuit. A satellite PN code generator generates a PN code sequence signal from a current code phase delay received from the DLL and provides the PN code sequence signal to the first circuit and the second circuit. The first circuit and the second circuit include a doppler multiplication module that multiplies the satellite signal with a hypothesized doppler frequency signal to generate a frequency shifted signal. A PN multiplication module multiplies the PN code sequence signal with the frequency shifted signal to generate a PN wiped signal. A coherent integrator integrates the PN wiped signal for a predefined time interval to generate a coherent accumulated data. A register is configured to store the coherent accumulated data generated at multiple predefined time intervals. A coherent summer sums the coherent accumulated data generated at multiple predefined time intervals. A non-coherent operator performs a non-coherent operation on an output of the coherent summer. The non-coherent operator in the first circuit performs a non-coherent operation on the output of the coherent summer to generate the first output and the non-coherent summer in the second circuit performs a non-coherent operation on the output of the coherent summer to generate the second output.

Yet another embodiment provides a GNSS receiver. The GNSS receiver includes a frequency locked loop (FLL), a delay locked loop (DLL) and a position computation unit coupled to the FLL and the DLL. The DLL includes a first circuit and a second circuit. The first circuit processes the satellite signal and generates a first output. The second circuit processes the satellite signal and generates a second output. A subtractor subtracts the first output from the second output and generates an error signal. A delay loop filter generates a current code phase delay from the error signal. The current code phase delay is positive shifted and provided as feedback to the first circuit and the current code phase delay is negative shifted and provided as feedback to the second circuit. A doppler frequency generator generates a hypothesized doppler frequency signal from a current doppler frequency signal from the FLL and provides the hypothesized doppler frequency signal to the first circuit and the second circuit. The first circuit and the second circuit further include a doppler multiplication module that multiplies the satellite signal with the hypothesized doppler frequency signal to generate a frequency shifted signal. A PN multiplication module multiplies a PN code sequence signal with the frequency shifted signal to generate a PN wiped signal. A coherent integrator integrates the PN wiped signal for a predefined time interval to generate a coherent accumulated data. A register is configured to store the coherent accumulated data generated at multiple predefined time intervals. A coherent summer sums the coherent accumulated data generated at multiple predefined time intervals. A non-coherent operator performs a non-coherent operation on an output of the coherent summer. The non-coherent operator in the first circuit is configured to perform a non-coherent operation on the output of the coherent summer to generate the first output and the non-coherent summer in the second circuit is configured to perform a non-coherent operation on the output of the coherent summer to generate the second output.

An embodiment provides a method of tracking a satellite signal in a GNSS receiver. A current doppler frequency is estimated from a frequency locked loop (FLL) and a current code phase delay is estimated from a delay locked loop (DLL). A current operating point of the satellite signal corresponds to the current doppler frequency and the current code phase delay of the satellite signal. A satellite signal strength is measured at a plurality of predefined offset points from the current operating point. A set of the plurality of predefined offset points are outside a tracking range of the FLL and the DLL. The FLL and the DLL are re-centered to a predefined offset point of the plurality of predefined offset points, with the satellite signal strength above a predefined threshold.

Other aspects and example embodiments are provided in the Drawings and the Detailed Description that follows.

BRIEF DESCRIPTION OF THE VIEWS OF DRAWINGS

DETAILED DESCRIPTION OF THE EMBODIMENTS

A received signal at a GNSS receiver contains one or more of the transmitted satellite signals. The acquisition of a satellite signal involves a two-dimensional search of carrier frequency and a pseudo-random number (PN) code sequence phase. Each satellite transmits a satellite signal using a unique PN code sequence, which repeats at regular intervals. For example, in one embodiment, a GPS satellite transmits 1023-chip long PN code sequence, which repeats every millisecond. In one embodiment, each satellite transmits a satellite signal using a unique carrier frequency. The GNSS receiver multiplies the received signal with a PN code sequence to identify the satellite signal. On detecting, the presence of a satellite signal in the received signal, the GNSS receiver locks onto the satellite signal for subsequent tracking of the corresponding GNSS satellite to receive satellite information. The GNSS receiver tracks the doppler frequency and PN code of the satellite signal after they are acquired with the help of frequency locked loop (FLL), delay locked loop (DLL) and other GNSS receiver tracking circuits. The FLL is used to measure the current doppler frequency of the satellite signal and the DLL is used to measure the current code phase delay of the satellite signal. The current doppler frequency and the current code phase delay of the satellite signal correspond to a current operating point of the satellite signal.

Figure 1:
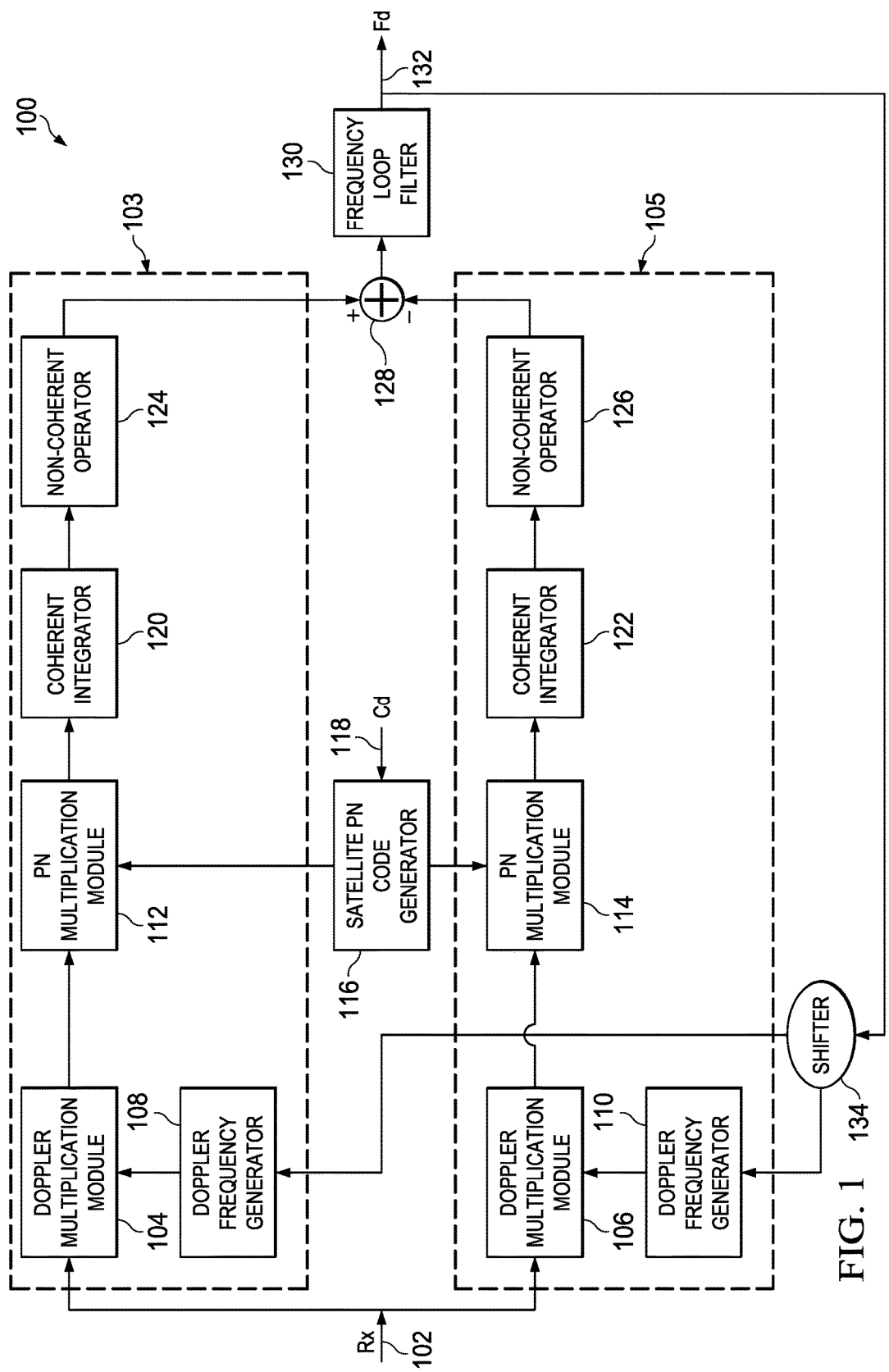
FIG. 1 illustrates a block diagram of a frequency locked loop (FLL) in a global navigation satellite system (GNSS) receiver.

FIG. 1 illustrates a block diagram of a frequency locked loop (FLL) 100 in a global navigation satellite system (GNSS) receiver. The FLL 100 receives a satellite signal (Rx) 102. The FLL 100 includes a first circuit 103 and a second circuit 105. The first circuit 103 includes a doppler multiplication module 104 that receives the satellite signal (Rx) 102. A doppler frequency generator 108 is coupled to the doppler multiplication module 104. A PN multiplication module 112 is coupled to an output of the doppler multiplication module 104. A coherent integrator 120 is coupled to an output of the PN multiplication module 112. An output of the coherent integrator 120 is received at a non-coherent operator 124. The second circuit 105 is similar in connections and operations to the first circuit 103. The second circuit includes a doppler multiplication module 106 that receives the satellite signal (Rx) 102. A doppler frequency generator 110 is coupled to the doppler multiplication module 106. A PN multiplication module 114 is coupled to an output of the doppler multiplication module 106. A coherent integrator 122 is coupled to an output of the PN multiplication module 114. An output of the coherent integrator 122 is received at a non-coherent operator 126. The non-coherent operator 124 generates a first output and the non-coherent operator 126 generates a second output. A subtractor 128 receives the first output and the second output. The subtractor 128 subtracts the first output from the second output and generates an error signal. The subtractor 128 may subtract the second output from the first output and generate an error signal. A frequency loop filter 130 is coupled to the subtractor 128 and generates a current doppler frequency (Fd) 132 from the error signal. The current doppler frequency (Fd) 132 is received by the shifter 134. The shifter 134 provides the current doppler frequency (Fd) 132 as a feedback to the doppler frequency generator 108 in the first circuit 103 and the doppler frequency generator 110 in the second circuit 105. A satellite PN code generator 116 is coupled to the PN multiplication module 112 and the PN multiplication module 114. The satellite PN code generator 116 receives a current code phase delay (Cd) 118 from a delay locked loop (DLL). The FLL 100 may include one or more additional components known to those skilled in the relevant art and are not discussed here for simplicity of the description.

The operation of the frequency locked loop (FLL) 100 illustrated in FIG. 1 is now explained. The first circuit 103 and the second circuit 105 processes the satellite signal (Rx) 102 and generates a first output and a second output respectively. The first circuit 103 and the second circuit 105 process the satellite signal in similar manner. Therefore, the operation of the first circuit 103 is explained and the operation of the second circuit 105 is not discussed here for simplicity of the description.

The doppler multiplication module 104 multiplies a hypothesized doppler frequency signal from the doppler frequency generator 108 with the satellite signal (Rx) 102 and generates a frequency shifted signal. The PN multiplication module 112 multiplies a PN code sequence signal from the satellite PN code generator 116 with the frequency shifted signal to generate a PN wiped signal. The coherent integrator 120 integrates the PN wiped signal for a predefined time interval to generate a coherent accumulated data. The non-coherent operator 124 sums the coherent accumulated data to generate the first output. Similarly, the non-coherent operator 126 sums the coherent accumulated data to generate the second output. The subtractor 128 subtracts the first output from the second output and generates an error signal. The frequency loop filter 130 generates the current doppler frequency (Fd) 132 from the error signal and provides the current doppler frequency (Fd) 132 to the shifter 134. The current doppler frequency (Fd) 132 is positive shifted by the shifter 134 and provided as feedback to the first circuit 103. The positive shifted current doppler frequency (Fd) 132 is provided to the doppler frequency generator 108. The doppler frequency generator 108 generates the hypothesized frequency signal from the positive shifted current doppler frequency (Fd) 132. The current doppler frequency (Fd) 132 is negative shifted by the shifter 134 and provided as feedback to the second circuit 105. The negative shifted current doppler frequency (Fd) 132 is provided to the doppler frequency generator 110. The doppler frequency generator 110 generates the hypothesized frequency signal from the negative shifted current doppler frequency (Fd) 132. The satellite PN code generator 116 generates the PN code sequence signal from the current code phase delay (Cd) 118 received from a delay locked loop (DLL) and provides the PN code sequence signal to the PN multiplication module 112 in the first circuit 103 and the PN multiplication module 114 in the second circuit 105.

Figure 2:
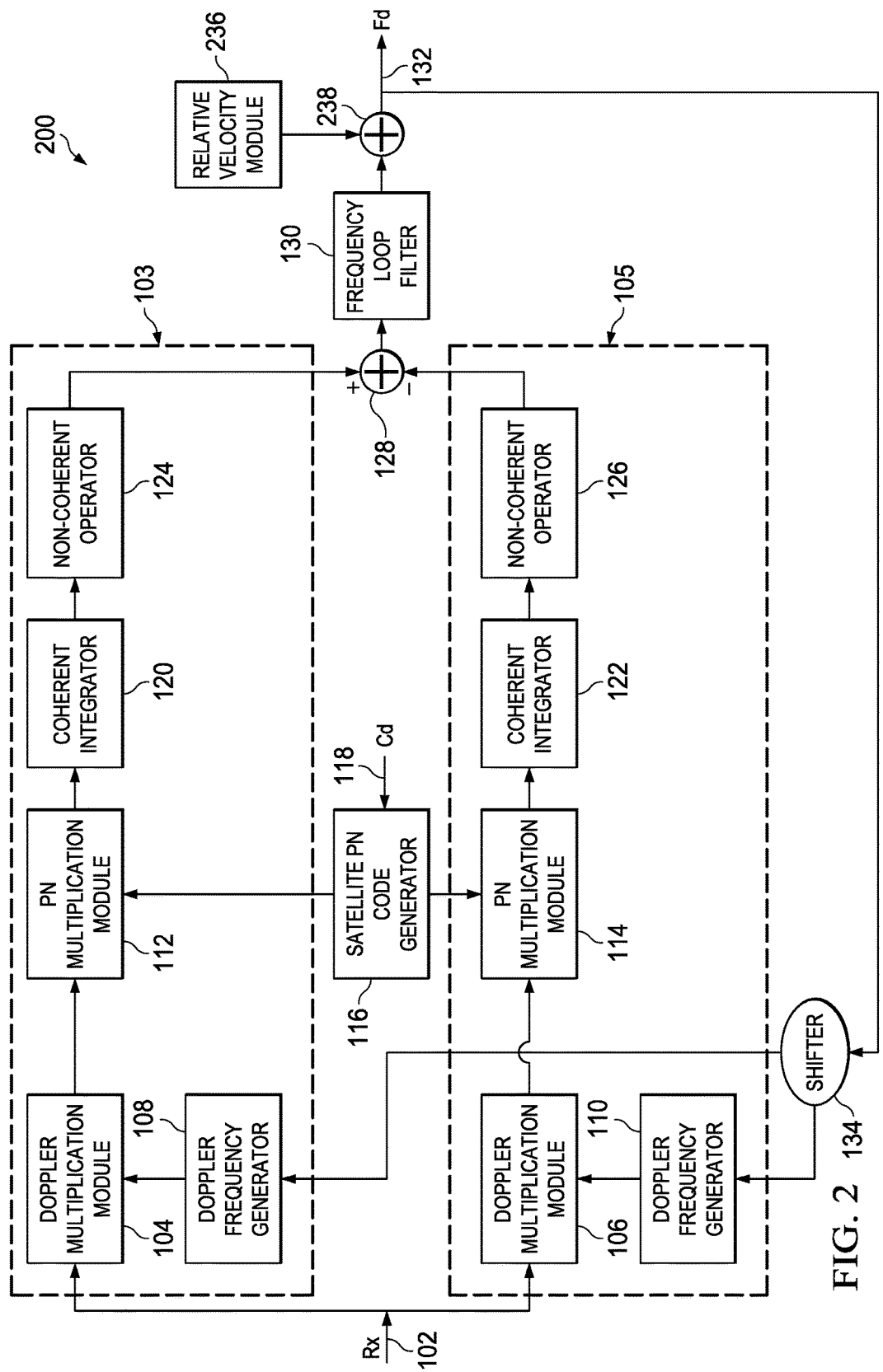
FIG. 2 illustrates a block diagram of a frequency locked loop (FLL) in a global navigation satellite system (GNSS) receiver.

FIG. 2 illustrates a block diagram of a frequency locked loop (FLL) 200 in a global navigation satellite system (GNSS) receiver. Those components of FIG. 2, which have identical reference numerals as those of FIG. 1, have same or similar functionalities and are therefore not explained again for brevity reasons. The relative velocity module 236 measures a relative velocity estimate between a satellite and the GNSS receiver, using one of the following parameters, but not limited to, a system time, ephemeris data, user position and motion sensor data. These parameters can also be obtained through network assistance, such as from WLAN, 3G, 4G transceivers present along with the GNSS receiver on a portable device. These parameters can also be obtained from motion sensors such as compass, gyrometers, accelerometers and the like. The relative velocity estimate and an output of the frequency loop filter 130 is provided to the summer 238 to generate the current doppler frequency (Fd) 132. The relative velocity module 236 can be coupled to the subtractor 128 and provides an output to the frequency loop filter 130. The relative velocity module 236 continually track changes in satellite dynamics, i.e. changes in satellite signal frequency and code phase delay caused by the satellite motion, user motion and a reference clock's frequency drifts. The relative velocity module 236 measures the relative velocity estimate. The relative velocity estimate includes an estimated satellite velocity and an estimated PN code period correction. The estimated satellite velocity is injected in the FLL 200, thus eliminating the processing requirement of the FLL 200 to track the satellite dynamics.

Figure 3:
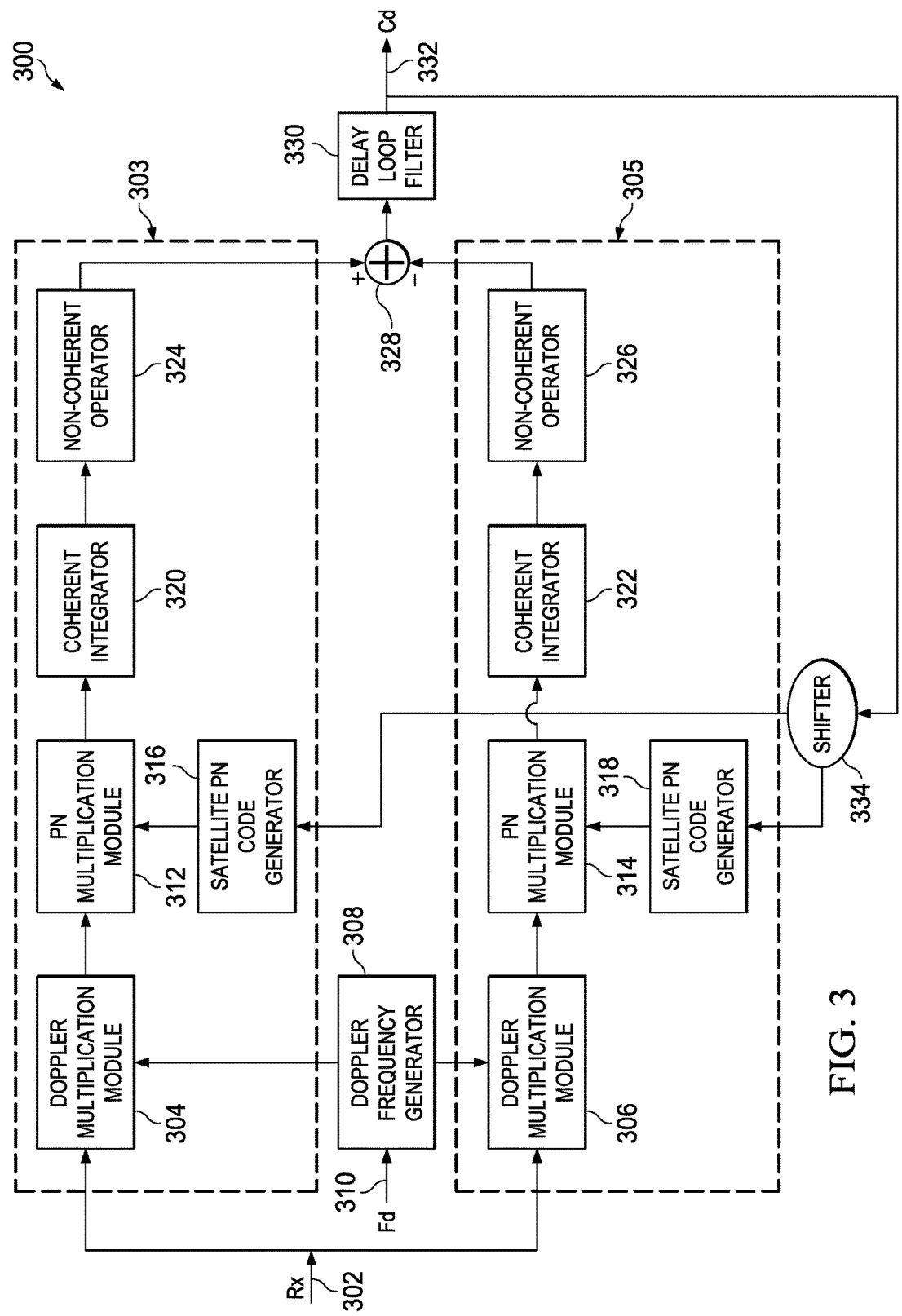
FIG. 3 illustrates a block diagram of a delay locked loop (DLL) in a global navigation satellite system (GNSS) receiver.

FIG. 3 illustrates a block diagram of a delay locked loop (DLL) 300 in a global navigation satellite system (GNSS) receiver. The DLL 300 receives a satellite signal (Rx) 302. The DLL 300 includes a first circuit 303 and a second circuit 305. The first circuit 303 includes a doppler multiplication module 304 that receives the satellite signal (Rx) 302. A PN multiplication module 312 is coupled to an output of the doppler multiplication module 304. A satellite PN code generator 316 is coupled to the PN multiplication module 312. A coherent integrator 320 is coupled to an output of the PN multiplication module 312. An output of the coherent integrator 320 is received at a non-coherent operator 324. The second circuit 305 is similar in connections and operations to the first circuit 303. The second circuit includes a doppler multiplication module 306 that receives the satellite signal (Rx) 302. A PN multiplication module 314 is coupled to an output of the doppler multiplication module 306. A satellite PN code generator 318 is coupled to the PN multiplication module 314. A coherent integrator 322 is coupled to an output of the PN multiplication module 314. An output of the coherent integrator 322 is received at a non-coherent operator 326. The non-coherent operator 324 generates a first output and the non-coherent operator 326 generates a second output. A subtractor 328 receives the first output and the second output. The subtractor 328 subtracts the first output from the second output and generates an error signal. The subtractor 328 may subtract the second output from the first output and generate an error signal. A delay loop filter 330 is coupled to the subtractor 328 and generates a current code phase delay (Cd) 332 from the error signal. The current code phase delay (Cd) 332 is received by the shifter 334. The shifter 334 provides the current code phase delay (Cd) 332 as a feedback to the satellite PN code generator 316 in the first circuit 303, and the satellite PN code generator 318 in the second circuit 305. A doppler frequency generator 308 is coupled to the doppler multiplication module 304 and the doppler multiplication module 306. The doppler frequency generator 308 receives a current doppler frequency (Fd) 310 from a frequency locked loop (FLL). The DLL 300 may include one or more additional components known to those skilled in the relevant art and are not discussed here for simplicity of the description.

The operation of the delay locked loop (DLL) 300 illustrated in FIG. 3 is now explained. The first circuit 303 and the second circuit 305 processes the satellite signal (Rx) 302 and generates a first output and a second output respectively. The first circuit 303 and the second circuit 305 process the satellite signal in similar manner. Therefore, the operation of the first circuit 303 is explained and the operation of the second circuit 305 is not discussed here for simplicity of the description.

The doppler multiplication module 304 multiplies a hypothesized doppler frequency signal from the doppler frequency generator 308 with the satellite signal (Rx) 302 and generates a frequency shifted signal. The PN multiplication module 312 multiplies a PN code sequence signal from the satellite PN code generator 316 with the frequency shifted signal to generate a PN wiped signal. The coherent integrator 320 integrates the PN wiped signal for a predefined time interval to generate a coherent accumulated data. The non-coherent operator 324 sums the coherent accumulated data to generate the first output. Similarly, the non-coherent operator 326 sums the coherent accumulated data to generate the second output. The subtractor 328 subtracts the first output from the second output and generates an error signal. The delay loop filter 330 generates the current code phase delay (Cd) 332 from the error signal and provides the current code phase delay (Cd) 332 to the shifter 334. The current code phase delay (Cd) 332 is positive shifted by the shifter 334 and provided as feedback to the first circuit 303. The positive shifted current code phase delay (Cd) 332 is provided to the satellite PN code generator 316. The satellite PN code generator 316 generates the PN code sequence signal from the positive shifted current code phase delay (Cd) 332. The current code phase delay (Cd) 332 is negative shifted by the shifter 334 and provided as feedback to the second circuit 305. The negative shifted current code phase delay (Cd) 332 is provided to the satellite PN code generator 318. The satellite PN code generator 318 generates the PN code sequence signal from the negative shifted current code phase delay (Cd) 332. The doppler frequency generator 308 generates the hypothesized doppler frequency signal from the current doppler frequency (Fd) 310 received from a frequency locked loop (FLL) and provides the hypothesized doppler frequency signal to the doppler multiplication module 304 in the first circuit 303 and the doppler multiplication module 306 in the second circuit 305.

Figure 4:
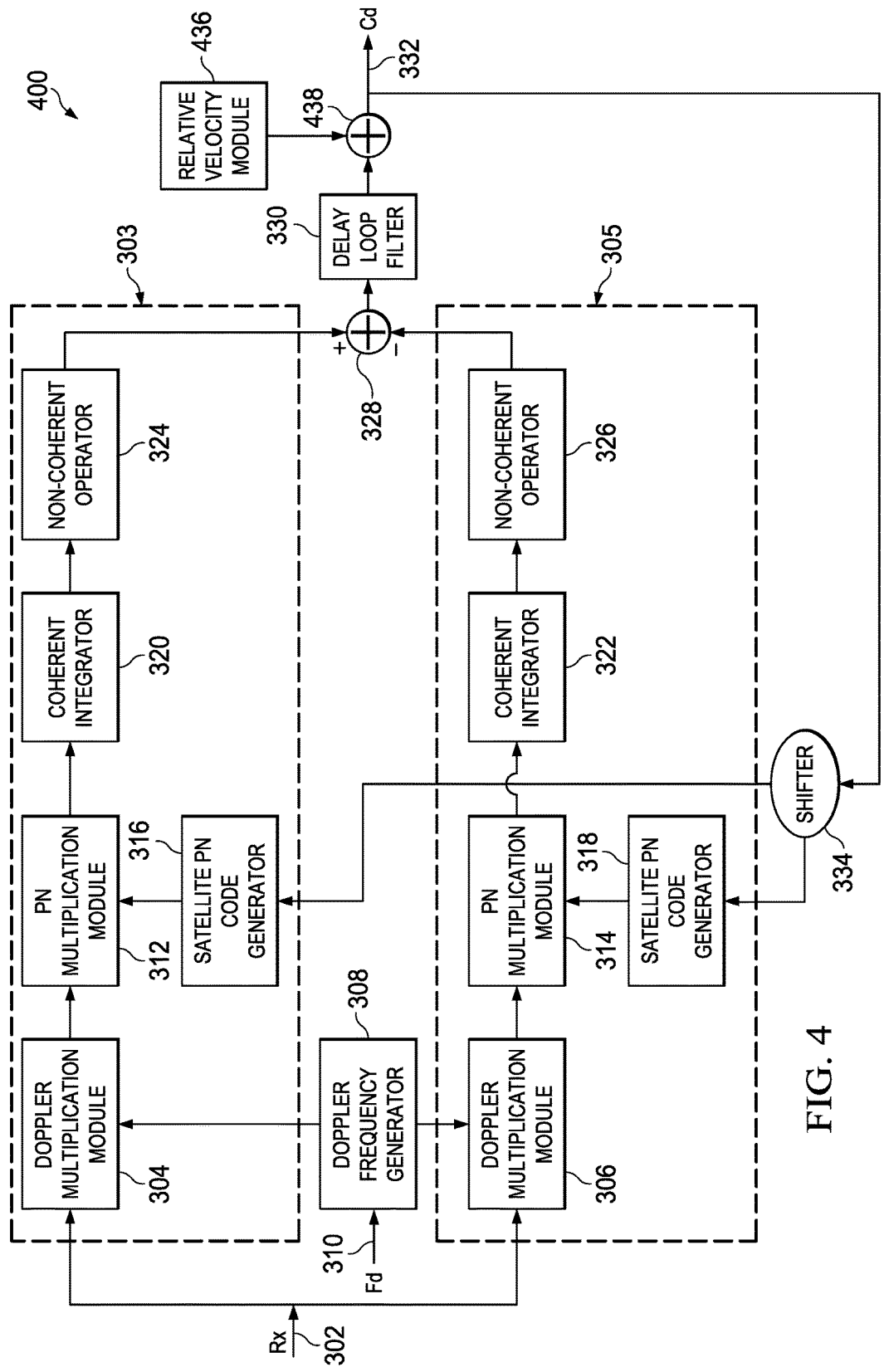
FIG. 4 illustrates a block diagram of a delay locked loop (DLL) in a global navigation satellite system (GNSS) receiver.

FIG. 4 illustrates a block diagram of a delay locked loop (DLL) 400 in a global navigation satellite system (GNSS) receiver. Those components of FIG. 3, which have identical reference numerals as those of FIG. 4, have same or similar functionalities and are therefore not explained again for brevity reasons. The relative velocity module 436 measures a relative velocity estimate between a satellite and the GNSS receiver, using one of the following parameters, but not limited to, a system time, ephemeris data, user position and motion sensor data. These parameters can be obtained through network assistance, such as from WLAN, 3G, 4G transceivers present along with the GNSS receiver on a portable device. These parameters can also be obtained from motion sensors such as compass, gyrometers, accelerometers and the like. The relative velocity estimate and an output of the delay loop filter 330 is provided to the summer 438 to generate the current code phase delay (Cd) 332. The relative velocity module 436 can be coupled to the subtractor 328 and provides an output to the delay loop filter 330. The relative velocity module 436 continually track changes in satellite dynamics, i.e. changes in satellite signal frequency and code phase delay caused by the satellite motion, user motion and a reference clock's frequency drifts. The relative velocity module 436 measures the relative velocity estimate. The relative velocity estimate includes an estimated satellite velocity and an estimated PN code period correction. The estimated PN code period correction is injected in the DLL 400, thus eliminating the processing requirement of the DLL 400 to track the satellite dynamics.

Figure 5:
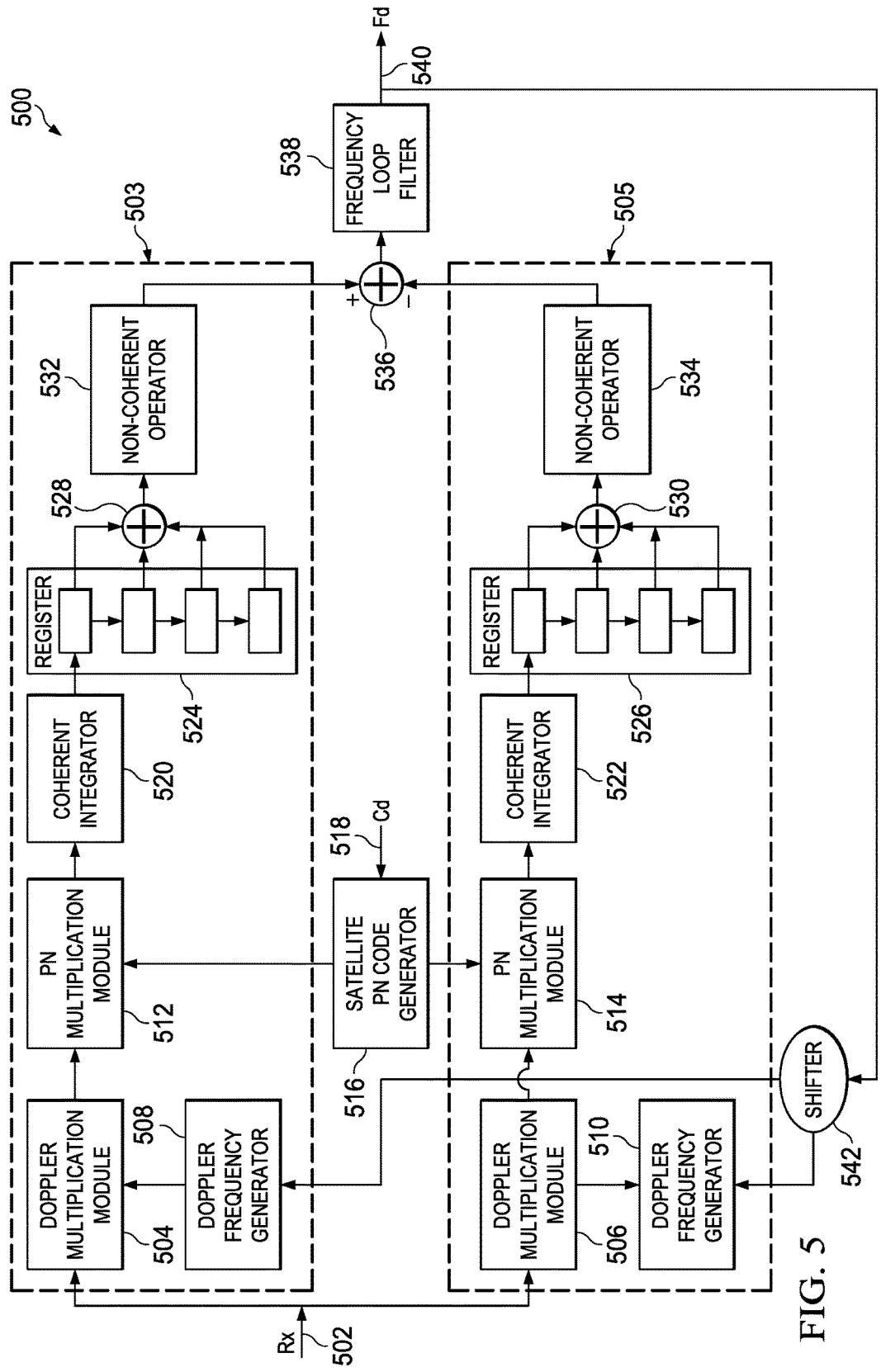
FIG. 5 illustrates a block diagram of a frequency locked loop (FLL) in a global navigation satellite system (GNSS) receiver, according to an embodiment.

FIG. 5 illustrates a block diagram of a frequency locked loop (FLL) 500 in a global navigation satellite system (GNSS) receiver, according to an embodiment. The FLL 500 receives a satellite signal (Rx) 502. The FLL 500 includes a first circuit 503 and a second circuit 505. The first circuit 503 includes a doppler multiplication module 504 that receives the satellite signal (Rx) 502. A doppler frequency generator 508 is coupled to the doppler multiplication module 504. A PN multiplication module 512 is coupled to an output of the doppler multiplication module 504. A coherent integrator 520 is coupled to an output of the PN multiplication module 512. An output of the coherent integrator 520 is received at a register 524. In one embodiment, the register 524 is a FIFO (first-in first-out) register. The register 524 is further coupled to a coherent summer 528. A non-coherent operator 532 receives an output of the coherent summer 528. The second circuit 505 is similar in connections and operations to the first circuit 503. The second circuit includes a doppler multiplication module 506 that receives the satellite signal (Rx) 502. A doppler frequency generator 510 is coupled to the doppler multiplication module 506. A PN multiplication module 514 is coupled to an output of the doppler multiplication module 506. A coherent integrator 522 is coupled to an output of the PN multiplication module 514. An output of the coherent integrator 522 is received at a register 526. The register 526 is further coupled to a coherent summer 530. A non-coherent operator 534 receives an output of the coherent summer 530. The non-coherent operator 532 generates a first output and the non-coherent operator 534 generates a second output. A subtractor 536 receives the first output and the second output. The subtractor 536 subtracts the first output from the second output and generates an error signal. In one embodiment, the subtractor 536 subtracts the second output from the first output and generates the error signal. A frequency loop filter 538 is coupled to the subtractor 536 and generates a current doppler frequency (Fd) 540 from the error signal. The current doppler frequency (Fd) 540 is received by the shifter 542. The shifter 542 provides the current doppler frequency (Fd) 540 as a feedback to the doppler frequency generator 508 in the first circuit 503 and the doppler frequency generator 510 in the second circuit 505. A satellite PN code generator 516 is coupled to the PN multiplication module 512 and the PN multiplication module 514. The satellite PN code generator 516 receives a current code phase delay (Cd) 518 from a delay locked loop (DLL). The FLL 500 may include one or more additional components known to those skilled in the relevant art and are not discussed here for simplicity of the description.

The operation of the frequency locked loop (FLL) 500 illustrated in FIG. 5 is now explained. The first circuit 503 and the second circuit 505 processes the satellite signal (Rx) 502 and generates a first output and a second output respectively. The first circuit 503 and the second circuit 505 process the satellite signal in similar manner. Therefore, the operation of the first circuit 503 is explained and the operation of the second circuit 505 is not discussed here for simplicity of the description.

The doppler multiplication module 504 multiplies a hypothesized doppler frequency signal from the doppler frequency generator 508 with the satellite signal (Rx) 502 and generates a frequency shifted signal. The PN multiplication module 512 multiplies a PN code sequence signal from the satellite PN code generator 516 with the frequency shifted signal to generate a PN wiped signal. The disclosed operations and sequences of multiplications are provided to explain the logical flow of methods and are understood not to limit the scope of the present disclosure. In an embodiment, the PN multiplication module 512 receives the satellite signal (Rx) 502 and performs multiplication operation on the satellite signal (Rx) 502. The doppler multiplication module 504 performs multiplication on an output of the PN multiplication module 512.

The coherent integrator 520 integrates the PN wiped signal for a predefined time interval to generate a coherent accumulated data. In one embodiment, the coherent integrator 520 sums all values of the PN wiped signal in the predefined time interval to generate coherent accumulated data. In an embodiment, the predefined time interval is defined by a user. In another embodiment, the predefined time interval is selected for optimum performance of the GNSS receiver or to efficiently track the satellite signal. The register 524 stores the coherent accumulated data generated at multiple predefined time intervals. The coherent summer 528 sums the coherent accumulated data generated at multiple predefined time intervals. In one embodiment, the register 524 is a FIFO register of N units, where N is selected to achieve a desired coherent integration time. Once after every predefined time interval, the FIFO is updated with an entry from the coherent integrator 520 and also, the coherent accumulated data in the N units of FIFO is summed by the coherent summer 528. The non-coherent operator 532 performs a non-coherent operation on an output of the coherent summer 528 to generate the first output. In one embodiment, the non-coherent operator 532 computes absolute values of an output of the coherent summer 528. In one embodiment, the non-coherent operator 532 includes known techniques, such as summing of squares of absolute values of output of the coherent summer 528 and the like. In an embodiment, the predefined time interval is 20 ms. The coherent integrator 520 sums the values of PN wiped signal for 20 ms to generate the coherent accumulated data. The register 524 stores, for example, 4 instances of the coherent accumulated data i.e. the register 524 stores coherent accumulated data generated at 20 ms, 40 ms, 60 ms and 80 ms. At 80 ms, the coherent summer 528 sums the coherent accumulated data generated at 20 ms, 40 ms, 60 ms and 80 ms (corresponding to the periods 0-20 ms, 20-40 ms, 40-60 ms, and 60-80 ms, respectively). The non-coherent operator 532 computes the absolute value of the output of the coherent summer 528 or computes the square of the absolute value of the output of the coherent summer 528. After next 20 ms elapses, i.e. at 100 ms, the register 524 holds the coherent accumulated data generated at 40 ms, 60 ms, 80 ms, and 100 ms. At 100 ms, the coherent summer 528 sums the coherent accumulated data generated at 40 ms, 60 ms, 80 ms and 100 ms (corresponding to the periods 20-40 ms, 40-60 ms, 60-80 ms, 80-100 ms respectively). The non-coherent operator 532 computes the absolute value of the output of the coherent summer 528 or computes the square of the absolute value of the output of the coherent summer 528. The use of register 524 and coherent summer 528 improves the sensitivity as well as the SNR (signal-to-noise ratio) of the GNSS receiver.

Similarly, the non-coherent operator 534 performs a non-coherent operation on an output of the coherent summer 530 to generate the second output. The subtractor 536 subtracts the first output from the second output and generates an error signal. In one embodiment, the subtractor 536 subtracts the second output from the first output to generate the error signal. The frequency loop filter 538 generates the current doppler frequency (Fd) 540 from the error signal and provides the current doppler frequency (Fd) 540 to the shifter 542. The current doppler frequency (Fd) 540 is positive shifted by the shifter 542 and provided as feedback to the first circuit 503. The positive shifted current doppler frequency (Fd) 540 is provided to the doppler frequency generator 508. The doppler frequency generator 508 generates the hypothesized doppler frequency signal from the positive shifted current doppler frequency (Fd) 540. In one embodiment, the doppler frequency generator 508 performs mathematical operations on the positive shifted current doppler frequency (Fd) 540 to compute the hypothesized doppler frequency signal. The current doppler frequency (Fd) 540 is negative shifted by the shifter 542 and provided as feedback to the second circuit 505. The negative shifted current doppler frequency (Fd) 540 is provided to the doppler frequency generator 510. The doppler frequency generator 510 generates the hypothesized doppler frequency signal from the negative shifted current doppler frequency (Fd) 540. In one embodiment, the doppler frequency generator 510 performs mathematical operations on the negative shifted current doppler frequency (Fd) 540 to compute the hypothesized doppler frequency signal. The satellite PN code generator 516 generates the PN code sequence signal from the current code phase delay (Cd) 518 received from a delay locked loop (DLL) and provides the PN code sequence signal to the PN multiplication module 512 in the first circuit 503 and the PN multiplication module 514 in the second circuit 505.

The FLL 500 has higher SNR and performance as compared to the FLL 100 as FLL 500 yields samples at shorter intervals. This is explained further with the help of following example. For example, the coherent integrator 120 of FLL 100 operates on data of 80 ms duration and feeds one input sample to the frequency loop filter 130 every 80 ms. Whereas, in FLL 500, the coherent integrator 520 and the register 524 operate on data of 4 successive periods of 20 ms duration each, and yield 4 input samples to the frequency loop filter 538 every 80 ms. It is to be noted that both the non-coherent operator 124 and non-coherent operator 532 operate on data of 80 ms duration received from the coherent integrator 120 and the coherent summer 528 respectively.

However frequency loop filter 538 receives 4 times more input samples than the frequency loop filter 130. In one embodiment, the FLL 500 provides upto 1 dB improvement in sensitivity as compared to FLL 100.

Figure 6:
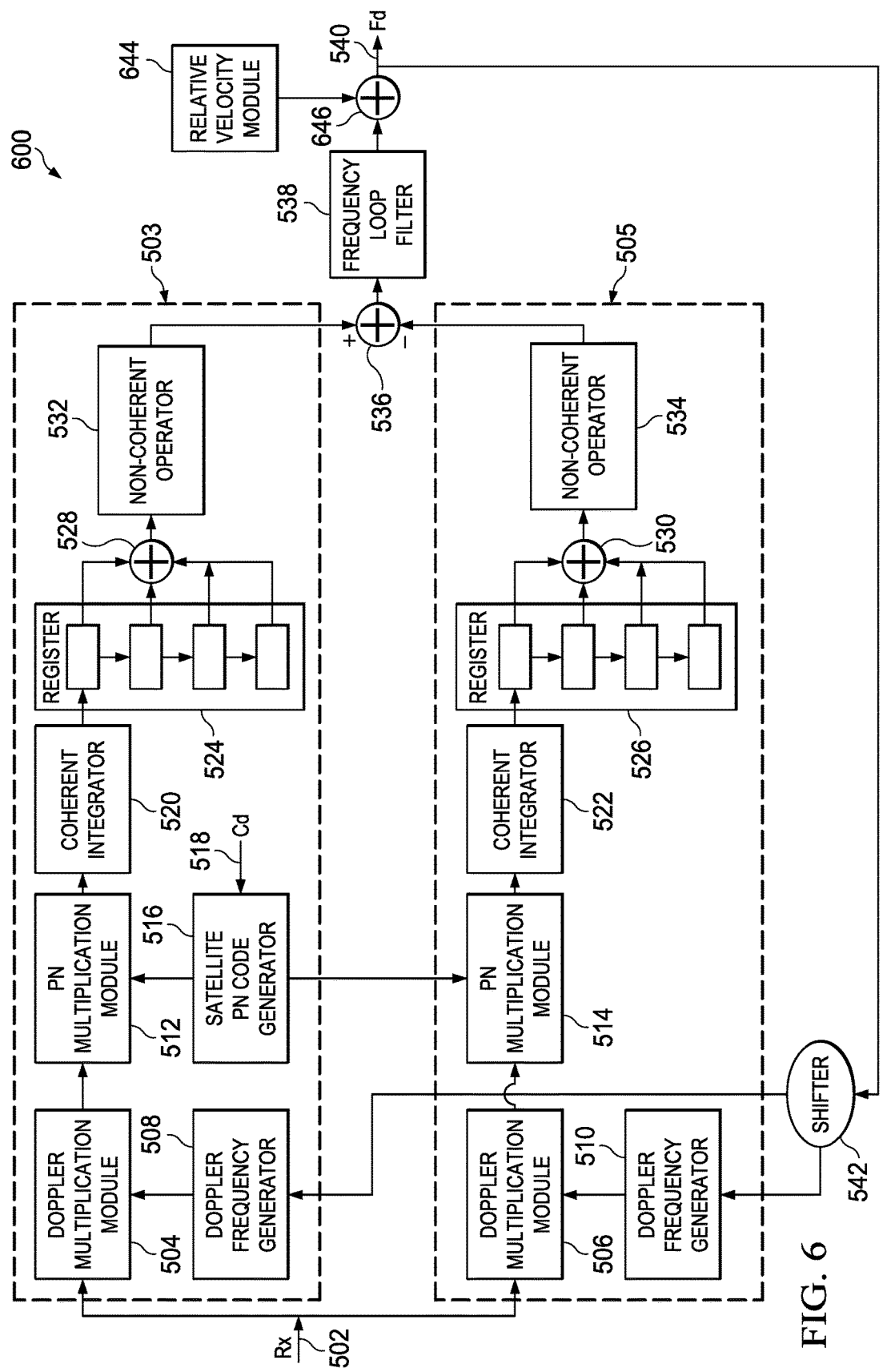
FIG. 6 illustrates a block diagram of a frequency locked loop (FLL) in a global navigation satellite system (GNSS) receiver, according to an embodiment.

FIG. 6 illustrates a block diagram of a frequency locked loop (FLL) 600 in a global navigation satellite system (GNSS) receiver, according to an embodiment. Those components of FIG. 6, which have identical reference numerals as those of FIG. 5, have same or similar functionalities and are therefore not explained again for brevity reasons. The relative velocity module 644 measures a relative velocity estimate between a satellite and the GNSS receiver, using one of the following parameters, but not limited to, a system time, ephemeris data, user position and motion sensor data. In one embodiment, these parameters are obtained through network assistance, such as from WLAN, 3G, 4G transceivers present along with the GNSS receiver on a portable device. In one embodiment, the parameters are obtained from motion sensors such as compass, gyrometers, accelerometers and the like. The relative velocity estimate and an output of the frequency loop filter 538 is provided to the summer 646 to generate the current doppler frequency (Fd) 540. In one embodiment, the relative velocity module 644 is coupled to the subtractor 536 and provides an output to the frequency loop filter 538. The relative velocity module 644 continually track the changes in satellite dynamics, i.e. changes in satellite signal frequency and code phase delay caused by the satellite motion, user motion and a reference clock's frequency drifts. The relative velocity module 644 measures the relative velocity estimate. The relative velocity estimate includes an estimated satellite velocity and an estimated PN code period correction. The estimated satellite velocity is injected in the FLL 600, thus eliminating the processing requirement of the FLL 600 to track the satellite dynamics.

Figure 7:
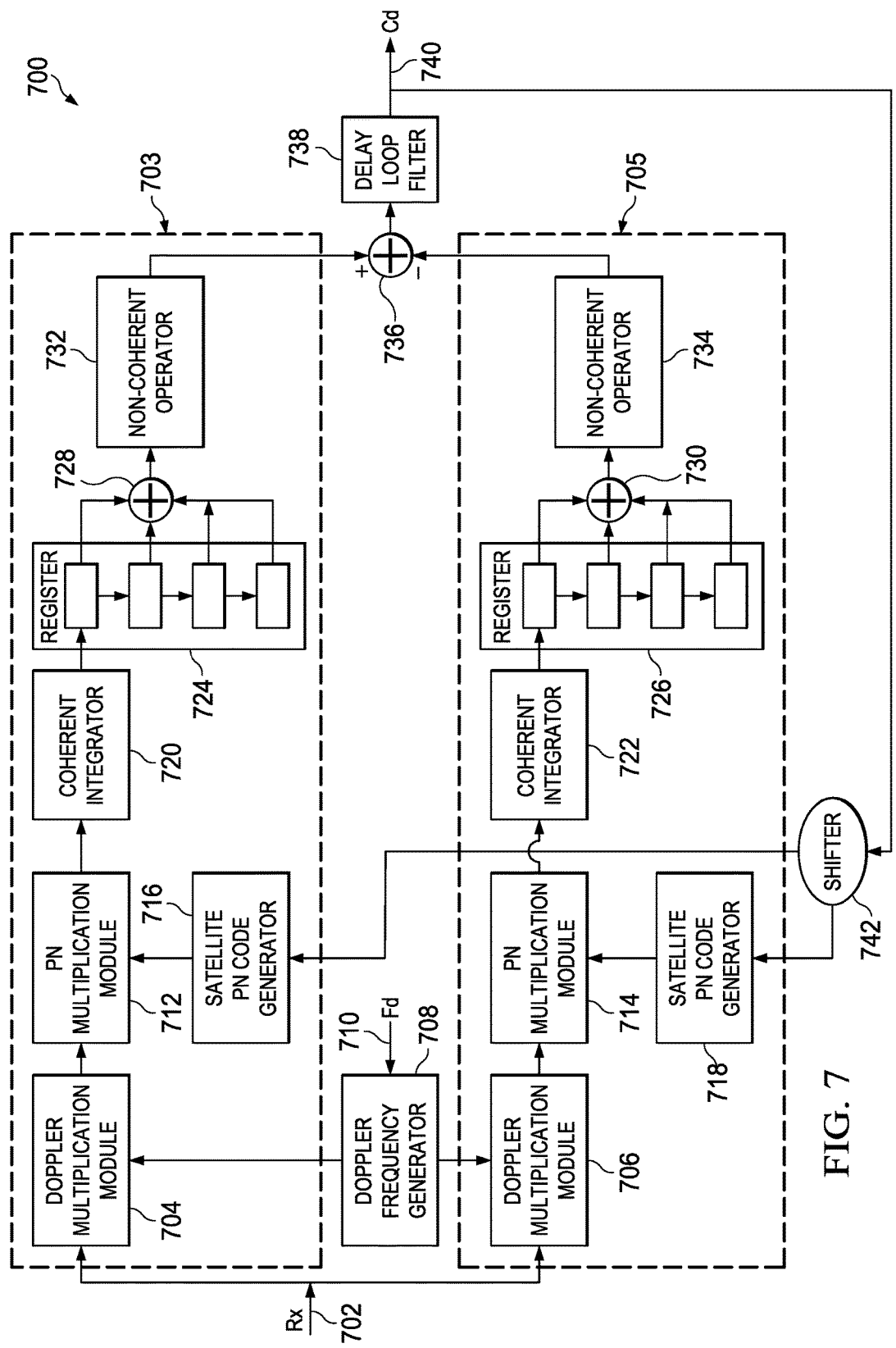
FIG. 7 illustrates a block diagram of a delay locked loop (DLL) in a global navigation satellite system (GNSS) receiver, according to an embodiment.

FIG. 7 illustrates a block diagram of a delay locked loop (DLL) 700 in a global navigation satellite system (GNSS) receiver, according to an embodiment. The DLL 700 receives a satellite signal (Rx) 702. The DLL 700 includes a first circuit 703 and a second circuit 705. The first circuit 703 includes a doppler multiplication module 704 that receives the satellite signal (Rx) 702. A PN multiplication module 712 is coupled to an output of the doppler multiplication module 704. A satellite PN code generator 716 is coupled to the PN multiplication module 712. A coherent integrator 720 is coupled to an output of the PN multiplication module 712. An output of the coherent integrator 720 is received at a register 724. In one embodiment, the register 524 is a FIFO (first-in first-out) register. The register 724 is further coupled to a coherent summer 728. A non-coherent operator 732 receives an output of the coherent summer 728. The second circuit 705 is similar in connections and operations to the first circuit 703. The second circuit 705 includes a doppler multiplication module 706 that receives the satellite signal (Rx) 702. A PN multiplication module 714 is coupled to an output of the doppler multiplication module 706. A satellite PN code generator 718 is coupled to the PN multiplication module 714. A coherent integrator 722 is coupled to an output of the PN multiplication module 714. An output of the coherent integrator 722 is received at a register 726. The register 726 is further coupled to a coherent summer 730. A non-coherent operator 734 receives an output of the coherent summer 730. The non-coherent operator 732 generates a first output and the non-coherent operator 734 generates a second output. A subtractor 736 receives the first output and the second output. The subtractor 736 subtracts the first output from the second output and generates an error signal. In one embodiment, the subtractor 736 subtracts the second output from the first output and generates the error signal. A delay loop filter 738 is coupled to the subtractor 736 and generates a current code phase delay (Cd) 740 from the error signal. The current code phase delay (Cd) 740 is received by the shifter 742. The shifter 742 provides the current code phase delay (Cd) 740 as a feedback to the satellite PN code generator 716 in the first circuit 703 and the satellite PN code generator 718 in the second circuit 705. A doppler frequency generator 708 is coupled to the doppler multiplication module 704 and the doppler multiplication module 706. The doppler frequency generator 708 receives a current doppler frequency (Fd) 710 from a frequency locked loop (FLL). The DLL 700 may include one or more additional components known to those skilled in the relevant art and are not discussed here for simplicity of the description.

The operation of the delay locked loop (DLL) 700 illustrated in FIG. 7 is now explained. The first circuit 703 and the second circuit 705 processes the satellite signal (Rx) 702 and generates a first output and a second output respectively. The first circuit 703 and the second circuit 705 process the satellite signal in similar manner. Therefore, the operation of the first circuit 703 is explained and the operation of the second circuit 705 is not discussed here for simplicity of the description.

The doppler multiplication module 704 multiplies a hypothesized doppler frequency signal from the doppler frequency generator 708 with the satellite signal (Rx) 702 and generates a frequency shifted signal. The PN multiplication module 712 multiplies a PN code sequence signal from the satellite PN code generator 716 with the frequency shifted signal to generate a PN wiped signal. The specifically disclosed operations and sequences of multiplications are provided to explain the logical flow of methods and are understood not to limit the scope of the present disclosure. In an embodiment, the PN multiplication module 712 receives the satellite signal (Rx) 702 and performs multiplication operation on the satellite signal (Rx) 702. The doppler multiplication module 704 performs multiplication on an output of the PN multiplication module 712.

The coherent integrator 720 integrates the PN wiped signal for a predefined time interval to generate a coherent accumulated data. In one embodiment, the coherent integrator 720 sums all values of the PN wiped signal in the predefined time interval to generate coherent accumulated data. In an embodiment, the predefined time interval is defined by a user. In another embodiment, the predefined time interval is selected for optimum performance of the GNSS receiver or to efficiently track the satellite signal. The register 724 stores the coherent accumulated data generated at multiple predefined time intervals. The coherent summer 728 sums the coherent accumulated data generated at multiple predefined time intervals. In one embodiment, the register 724 is a FIFO register of N units, where N is selected to achieve a desired coherent integration time. Once after every predefined time interval, the FIFO is updated with an entry from the coherent integrator 720 and also, the coherent accumulated data in the N units of FIFO is summed by the coherent summer 728. The non-coherent operator 732 performs a non-coherent operation on an output of the coherent summer 728 to generate the first output. In one embodiment, the non-coherent operator 732 computes absolute values of an output of the coherent summer 728. In one embodiment, the non-coherent operator 732 may include known techniques, such as summing of squares of absolute values of output of the coherent summer 728 and the like. In an embodiment, the predefined time interval is 20 ms. The coherent integrator 720 sums the values of PN wiped signal for 20 ms to generate the coherent accumulated data. The register 724 stores, for example, 4 instances of the coherent accumulated data i.e. the register 724 stores coherent accumulated data generated at 20 ms, 40 ms, 60 ms and 80 ms. At 80 ms, the coherent summer 728 sums the coherent accumulated data generated at 20 ms, 40 ms, 60 ms and 80 ms (corresponding to the periods 0-20 ms, 20-40 ms, 40-60 ms, and 60-80 ms, respectively). The non-coherent operator 732 computes the absolute value of the output of the coherent summer 728 or computes the square of the absolute value of the output of the coherent summer 728. After next 20 ms elapses, i.e. at 100 ms, the register 724 holds the coherent accumulated data generated at 40 ms, 60 ms, 80 ms, and 100 ms. At 100 ms, the coherent summer 728 sums the coherent accumulated data generated at 40 ms, 60 ms, 80 ms and 100 ms (corresponding to the periods 20-40 ms, 40-60 ms, 60-80 ms, 80-100 ms respectively). The non-coherent operator 732 computes the absolute value of the output of the coherent summer 728 or computes the square of the absolute value of the output of the coherent summer 728. The use of register 724 and coherent summer 728 improves the sensitivity as well as the SNR (signal-to-noise ratio) of the GNSS receiver.

Similarly, the non-coherent operator 734 performs a non-coherent operation on an output of the coherent summer 730 to generate the second output. The subtractor 736 subtracts the first output from the second output and generates an error signal. In one embodiment, the subtractor 736 subtracts the second output from the first output to generate the error signal. The delay loop filter 738 generates the current code phase delay (Cd) 740 from the error signal and provides the current code phase delay (Cd) 740 to the shifter 742. The current code phase delay (Cd) is positive shifted by the shifter 742 and provided as feedback to the first circuit 703. The positive shifted current code phase delay (Cd) 740 is provided to the satellite PN code generator 716. The satellite PN code generator 716 generates the PN code sequence signal from the positive shifted current code phase delay (Cd) 740. The current code phase delay (Cd) 740 is negative shifted by the shifter 742 and provided as feedback to the second circuit 705. The negative shifted current code phase delay (Cd) 740 is provided to the satellite PN code generator 718. The satellite PN code generator 718 generates the hypothesized doppler frequency signal from the negative shifted current code phase delay (Cd) 740. The doppler frequency generator 708 generates the PN code sequence signal from a current doppler frequency (Fd) 710 received from a frequency locked loop (FLL) and provides the hypothesized doppler frequency signal to the doppler multiplication module 704 in the first circuit 703 and the doppler multiplication module 706 in the second circuit 705. In one embodiment, the doppler frequency generator 708 performs mathematical operations on the current doppler frequency (Fd) 710 to compute the hypothesized doppler frequency signal.

The DLL 700 has higher SNR and performance as compared to the DLL 300 as DLL 700 yields samples at shorter intervals. This is explained further with the help of following example. For example, the coherent integrator 320 of DLL 300 operates on data of 80 ms duration and feeds one input sample to the delay loop filter 330 every 80 ms. Whereas, in DLL 700, the coherent integrator 720 and the register 724 operate on data of 4 successive periods of 20 ms duration each, and yield 4 input samples to the delay loop filter 738 every 80 ms. It is to be noted that both the non-coherent operator 324 and non-coherent operator 732 operate on data of 80 ms duration received from the coherent integrator 320 and the coherent summer 728 respectively. However delay loop filter 738 receives 4 times more input samples than the delay loop filter 330. In one embodiment, the DLL 700 provides upto 1 dB improvement in sensitivity as compared to DLL 300.

Figure 8:
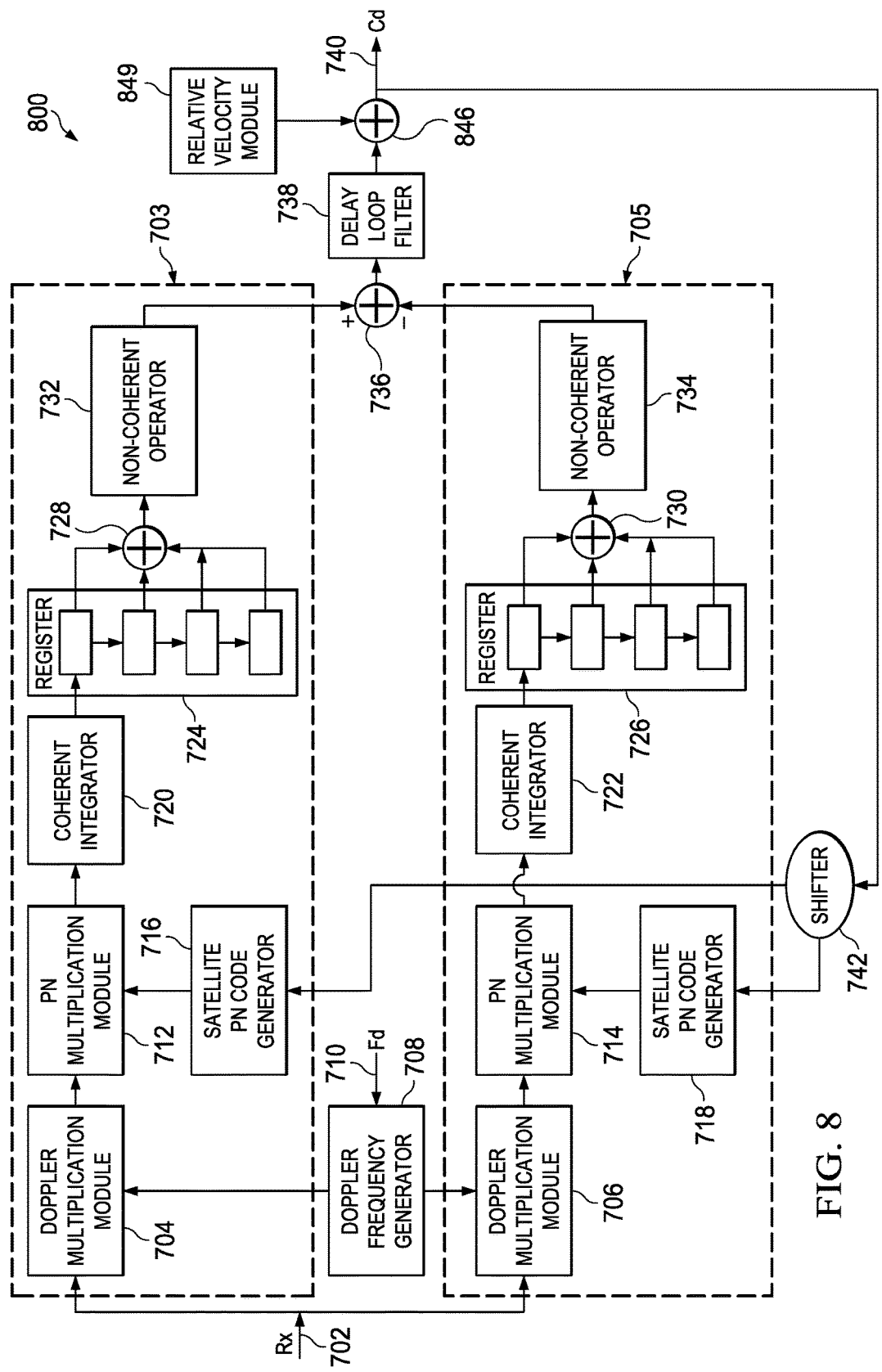
FIG. 8 illustrates a block diagram of a delay locked loop (DLL) in a global navigation satellite system (GNSS) receiver, according to an embodiment.

FIG. 8 illustrates a block diagram of a delay locked loop (DLL) 800 in a global navigation satellite system (GNSS) receiver, according to an embodiment. Those components of FIG. 8, which have identical reference numerals as those of FIG. 7, have same or similar functionalities and are therefore not explained again for brevity reasons. The relative velocity module 844 measures a relative velocity estimate between a satellite and the GNSS receiver, using one of the following parameters, but not limited to, a system time, ephemeris data, user position and motion sensor data. In one embodiment, these parameters are obtained through network assistance, such as from WLAN, 3G, 4G transceivers present along with the GNSS receiver on a portable device. In one embodiment, the parameters are obtained from motion sensors such as compass, gyrometers, accelerometers and the like. The relative velocity estimate and an output of the delay loop filter 738 is provided to the summer 846 to generate the current code phase delay (Cd) 740. In one embodiment, the relative velocity module 844 is coupled to the subtractor 736 and provides an output to the delay loop filter 738. The relative velocity module 844 continually track the changes in satellite dynamics, i.e. changes in satellite signal frequency and code phase delay caused by the satellite motion, user motion and a reference clock's frequency drifts. The relative velocity module 844 measures the relative velocity estimate. The relative velocity estimate includes an estimated satellite velocity and an estimated PN code period correction. The estimated PN code period correction is injected in the DLL 800, thus eliminating the processing requirement of the DLL 800 to track the satellite.

Figure 9:
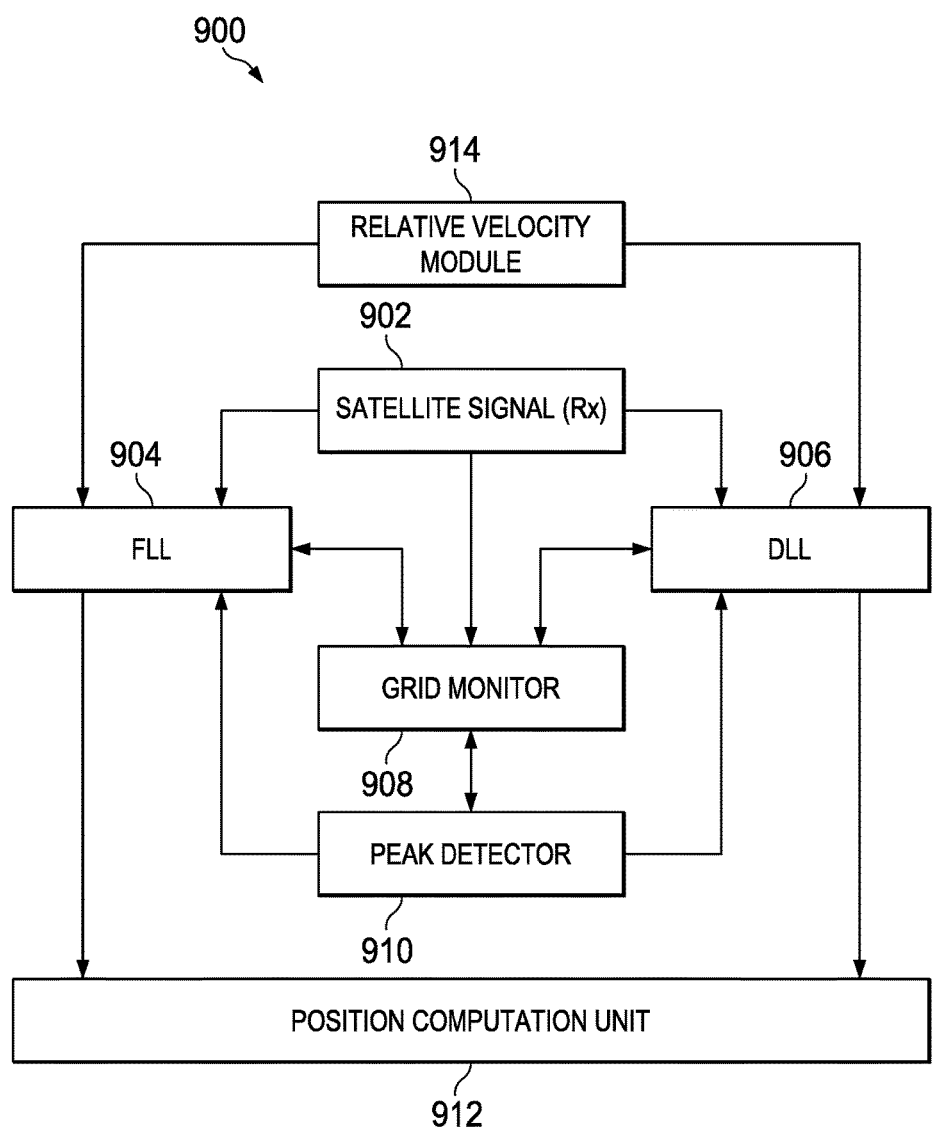
FIG. 9 illustrates a block diagram of a global navigation satellite system (GNSS) receiver, according to an embodiment.

FIG. 9 illustrates a block diagram of a global navigation satellite system (GNSS) receiver 900, according to an embodiment. The GNSS receiver 900 includes a frequency locked loop (FLL) 904 and a delay locked loop (DLL) 906. A satellite signal (Rx) 902 is received at the FLL 904 and the DLL 906. A grid monitor 908 is coupled to the FLL 904 and the DLL 906. The grid monitor 908 also receives the satellite signal (Rx) 902. A peak detector 910 is coupled to the grid monitor 908. The peak detector 910 is further coupled to the FLL 904 and the DLL 906. A position computation unit 912 is coupled to the FLL 904 and the DLL 906. A relative velocity module 914 is coupled to the FLL 904 and the DLL 906. The GNSS receiver 900 may include one or more additional components known to those skilled in the relevant art and are not discussed here for simplicity of the description.

In a traditional GNSS receiver, after the acquisition of the satellite signal, the GNSS receiver need to continuously track further changes in satellite's current doppler frequency and current code phase delay. These changes are caused by satellite's motion, user's motion, the GNSS receiver reference clock, satellite's frequency drift and the like. The FLL is used to track satellite's current doppler frequency and the DLL is used to track satellite's current code phase delay. The traditional GNSS receiver tends to lose track of the satellite signal at low power and hence undergo satellite signal acquisition process. Satellite signal acquisition process is power intensive and slow process since the current doppler frequency and current code phase delay are updated at a very slow rate. Further, the process of satellite signal acquisition for low power satellite signal may take several seconds which degrades the performance of the GNSS receiver. The GNSS receiver 900 addresses these problems as explained in the following paragraphs.

Figure 10A:
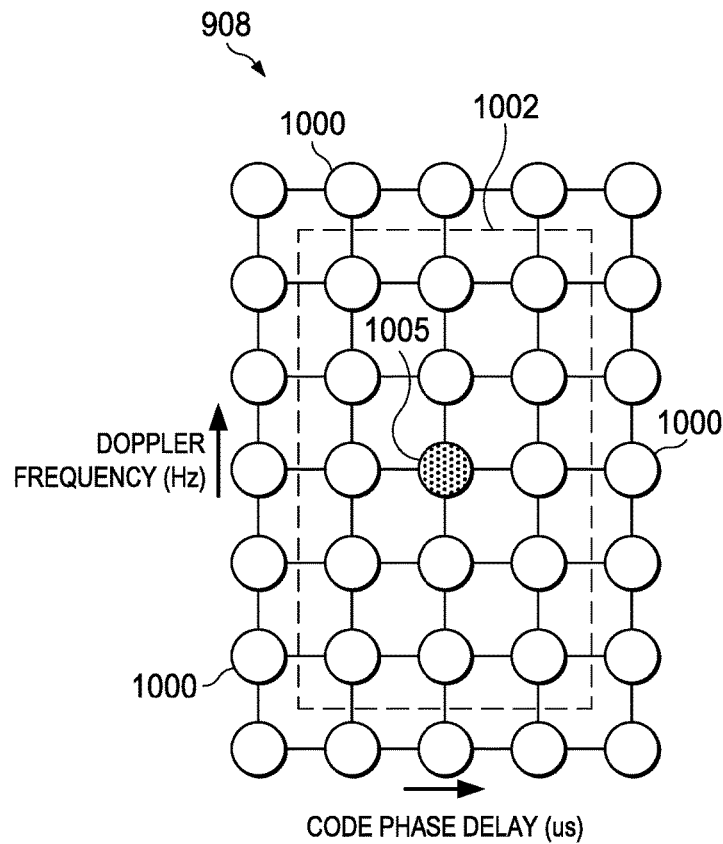
FIG. 10(a) illustrates a functional representation of grid monitor, according to an embodiment.
Figure 10B:
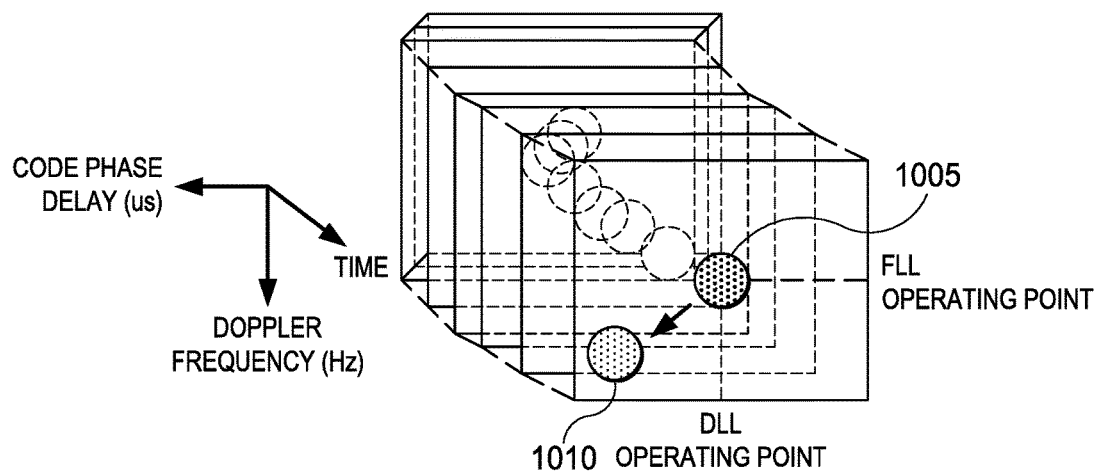
FIG. 10(b) illustrates the functioning of the grid monitor over a tracking period, according to an embodiment.

The operation of the GNSS receiver 900 illustrated in FIG. 9 is now explained. Also, FIG. 10(a) and FIG. 10(b) are described in the following paragraphs to further illustrate the operation of the GNSS receiver 900. The FLL 904 is one of the FLL 100, FLL 200, FLL 500 and FLL 600. The DLL 906 is one of the DLL 300, DLL 400, DLL 700 and DLL 800. The FLL 904 is used to track satellite's current doppler frequency and the DLL 906 is used to track satellite's current code phase delay. The current doppler frequency and the current code phase delay corresponds to a current operating point of the satellite signal (Rx) 902. The current operating point is the point of operation of the satellite signal (Rx) 902. The FLL 904 and the DLL 906 are operating or centered at the current operating point. The position computation unit 912 computes the position of GNSS receiver 900 using the current doppler frequency and the current code phase delay. The grid monitor 908 measures a satellite signal strength at a plurality of predefined offset points from the current operating point. The satellite signal strength is a measure of one or more of the following, but not limited to, power, amplitude, energy and the like.

FIG. 10(a) illustrates a functional representation of grid monitor 908, according to an embodiment. As illustrated in FIG. 10(a), the grid monitor 908 has a plurality of predefined offset points 1000 depicted as blank circles. Each predefined offset point (blank circle) of the plurality of predefined offset points 1000 in the grid monitor 908 represents a unique doppler frequency and code phase delay. The dark circle represents the current operating point 1005 of the satellite signal (Rx) 902 which corresponds to the current doppler frequency and the current code phase delay of the satellite signal. In an embodiment, the spacing between the circles is fraction of 1/T and PN code sequence period, where T is a predefined time interval used for coherent integration in the FLL 904 and the DLL 906. A satellite transmits the PN code sequence at regular intervals defined as PN code sequence period for that satellite signal. In one embodiment, the blank circles are at predefined offset points from the current operating point 1005. The dotted line 1002 in FIG. 10(a) represents a tracking range of the FLL 904 and the DLL 906. The FLL 904 and the DLL 906 can detect the satellite signal (Rx) 902 within the tracking range. The tracking range of the FLL 904 and the DLL 906 is determined by the following factors, but is not limited to, FLL and DLL design parameters, coherent integration time, frequency loop filter and delay loop filter bandwidth and frequency loop filter and delay loop filter gain. For example, if the coherent integration time is T and the PN code sequence period is Tc, then the tracking range in the frequency dimension is +/−k/T, where k can be from 0.5 to 1 and the tracking range in the code phase dimension is +/−p/Tc, where p can be from 0.5 to 1. If the error between the FLL's current doppler frequency and an actual satellite doppler frequency or the DLL's current code phase delay and an actual satellite code phase delay is outside the respective tracking range, then the FLL 904 and DLL 906 are known to lose track of the satellite signal. But the GNSS receiver 900 still continues to track the satellite signal (Rx) 902 through the use of grid monitor 908. In an embodiment, the tracking range of the FLL 904 and the DLL 906 and the parameters k and p are tuned for optimum performance of the GNSS receiver 900.

The grid monitor 908 measures a satellite signal strength at the plurality of predefined offset points 1000 illustrated in FIG. 10. It is noted that a set of the plurality of predefined offset points 1000 are outside the tracking range of the FLL 904 and the DLL 906. The peak detector 910 coupled to the grid monitor 908 is configured to process the satellite signal strengths at the plurality of predefined offset points and configured to re-center the FLL 904 and the DLL 906 to a predefined offset point with the satellite signal strength above a predefined threshold. In an embodiment, the peak detector 910 is configured to re-center the FLL 904 and the DLL 906, when the predefined offset point is outside the tracking range of the FLL 904 and the DLL 906. In an embodiment, the peak detector 910 is configured to re-center the FLL 904 and the DLL 906 based on one or more of the following criteria, but not limited to, the satellite signal strength at the predefined offset point above the predefined threshold and the predefined offset point is outside the tracking range of the FLL 904 and the DLL 906. In one embodiment, the predefined threshold is defined by the user. In one embodiment, the ratio of satellite signal strength at the predefined offset point and the satellite signal strength at the current operating point is above a predefined threshold. In one embodiment, the predefined threshold is selected for optimum performance of the GNSS receiver 900. In one embodiment, if the satellite signal strength at the plurality of predefined offset points is below the predefined threshold, then the FLL 904 and the DLL 906 continue to track the satellite signal (Rx) 902 at the current operating point 1005.

FIG. 10(b) illustrates the functioning of the grid monitor 908 over a tracking period, according to an embodiment. As illustrated in FIG. 10(b), the plurality of predefined offset points 1000 depicted as blank circles in the grid monitor follow the estimates received from the FLL 904 and the DLL 906 with the center black circle continue to be the operating point of the satellite signal (Rx) 902. At high satellite signal strengths, the grid monitor 908 is refreshed and continue to measure the satellite signal strengths at the plurality of predefined offset points. At low satellite signal strength when a user has suddenly accelerated t or very quickly accelerated to a largely different position as shown by new operating point 1010, the FLL 904 and the DLL 906 will be operating away from the actual operating point of satellite signal. In this condition, the peak detector 910 evaluate the satellite signal strengths at the plurality of predefined offset points 1000 and re-center the FLL 904 and the DLL 906 to the new operating point 1010 with the satellite signal strength above a predefined threshold. Thus, the peak detector 910 shifts the current operating point to one of the plurality of predefined offset point (illustrated as 1010) with the satellite signal strength above a predefined threshold.

The GNSS receiver 900 also includes a relative velocity module 914 coupled to the FLL 904 and the DLL 906. The relative velocity module 914 measures a relative velocity estimate between a satellite and the GNSS receiver 900, using one of the following parameters, but not limited to, a system time, ephemeris data, user position and motion sensor data. In one embodiment, these parameters are obtained through network assistance, such as from WLAN, 3G, 4G transceivers present along with the GNSS receiver 900 on a portable device. In one embodiment, the parameters are obtained from motion sensors such as compass, gyrometers, accelerometers and the like. The relative velocity module 914 continually track the changes in satellite dynamics, i.e. changes in satellite signal frequency and code phase delay caused by the satellite motion, user motion and a reference clock's frequency drifts. The relative velocity module 914 measures the relative velocity estimate. The relative velocity estimate includes an estimated satellite velocity and an estimated PN code period correction. The estimated satellite velocity is injected in the FLL 904 and the estimated PN code period correction is injected in the DLL 906, thus eliminating the processing requirement of the FLL 904 and the DLL 906 to track the satellite dynamics.

The flowchart diagram that follows is generally set forth as logical flowchart diagram. The depicted operations and sequences thereof are indicative of at least one embodiment of the present disclosure. It should be appreciated, however, that the scope of the present disclosure includes methods that use other operations and sequences, and methods that are useful or similar in function, logic, or effect. Accordingly, the disclosed operations, sequences, and formats are provided to explain the logical flow of the methods and are understood not to limit the scope of the present disclosure.

Figure 11:
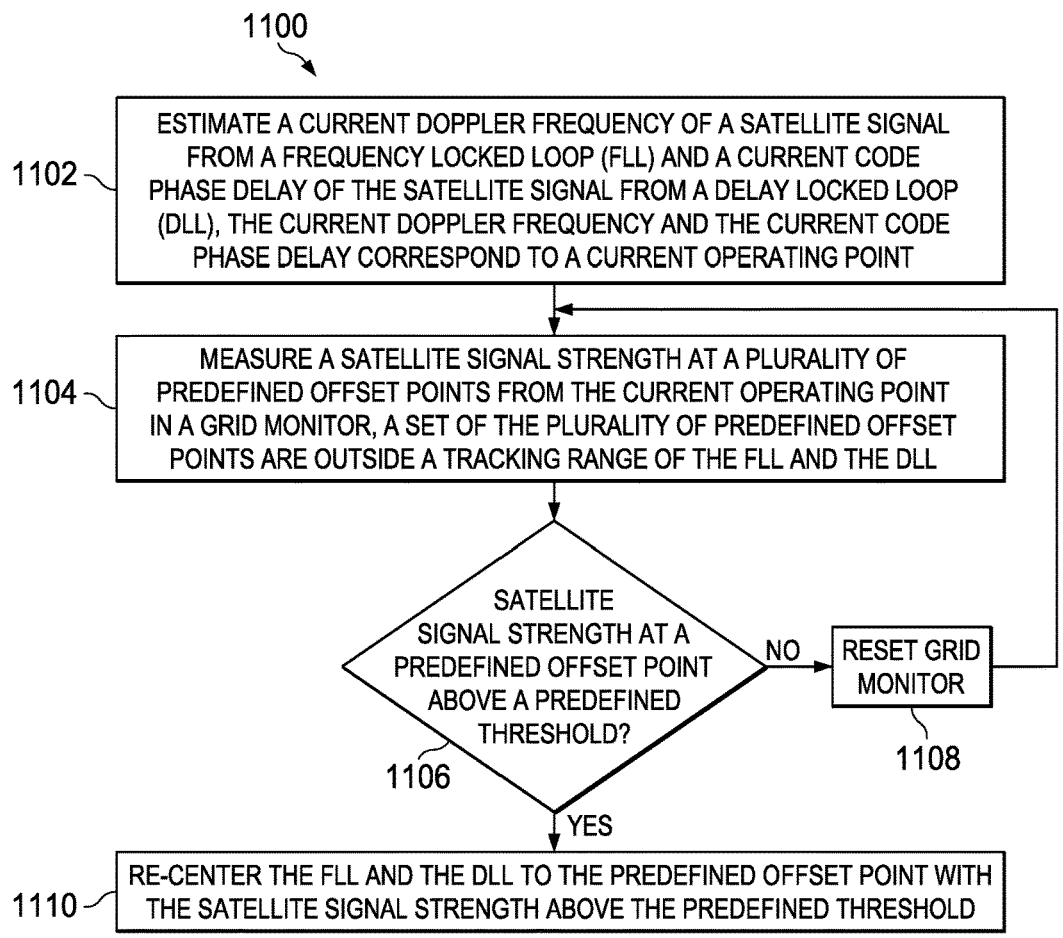
FIG. 11 is a flowchart illustrating a method of tracking a satellite signal in a GNSS receiver, according to an embodiment.

FIG. 11 is a flowchart 1100 illustrating a method of tracking a satellite signal in a GNSS receiver, according to an embodiment. At step 1102, the FLL (frequency locked loop) for example the FLL 904 (illustrated in FIG. 9) is used to estimate satellite's current doppler frequency and the DLL (delay locked loop) for example the DLL 906 (illustrated in FIG. 9) is used to estimate satellite's current code phase delay. The current doppler frequency and the current code phase delay corresponds to a current operating point of the satellite signal. The current operating point is the point of operation of the satellite signal. The FLL and the DLL are operating or centered at the current operating point. At step 1104, the grid monitor for example the grid monitor 908 (illustrated in FIG. 9) measures satellite signal strength at a plurality of predefined offset points from the current operating point. The satellite signal strength is a measure of one or more of the following, but not limited to, power, amplitude, energy and the like.

A set of the plurality of predefined offset points are outside a tracking range of the FLL and the DLL. The tracking range of the FLL and the DLL is determined by the following factors, but is not limited to, FLL and DLL design parameters, coherent integration time, frequency loop filter and delay loop filter bandwidth and frequency loop filter and delay loop filter gain. The FLL and the DLL can detect the satellite signal within the tracking range. The grid monitor is used to track the satellite signal when the satellite signal falls outside the tracking range of the FLL and the DLL. At step 1106, a condition check is made that if the satellite signal strength at a predefined offset point is above a predefined threshold. In one embodiment, a condition check is made that if the ratio of the satellite signal strength at a predefined offset point and the satellite signal strength at the current operating point is above a predefined threshold. If this condition is not met, then the system follows step 1108 in which the FLL and the DLL continue to track the satellite signal at the current operating point and the grid monitor is reset. If the condition at step 1108 exists, then the system follows step 1110 in which the FLL and the DLL are re-centered to the predefined offset point with the satellite signal strength above the predefined threshold.

Figure 12:
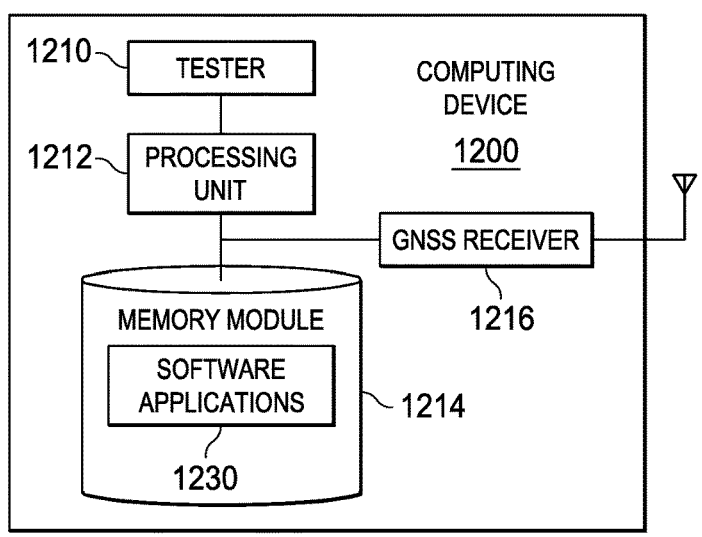
FIG. 12 illustrates a computing device according to an embodiment.

FIG. 12 illustrates a computing device 1200 according to an embodiment. The computing device 1200 is, or is incorporated into, a mobile communication device, such as a mobile phone, a personal digital assistant, a personal computer, or any other type of electronic system.

In some embodiments, the computing device 1200 comprises a megacell or a system-on-chip (SoC) which includes a processing unit 1212 such as a CPU (Central Processing Unit), a memory module 1214 (e.g., random access memory (RAM)) and a tester 1210. The processing unit 1212 can be, for example, a CISC-type (Complex Instruction Set Computer) CPU, RISC-type CPU (Reduced Instruction Set Computer), or a digital signal processor (DSP). The memory module 1214 (which can be memory such as RAM, flash memory, or disk storage) stores one or more software application 1230 (e.g., embedded applications) that, when executed by the processing unit 1212, perform any suitable function associated with the computing device 1200. The tester 1210 comprises logic that supports testing and debugging of the computing device 1200 executing the software application 1230. For example, the tester 1210 can be used to emulate a defective or unavailable component(s) of the computing device 1200 to allow verification of how the component(s), were it actually present on the computing device 1200, would perform in various situations (e.g., how the component(s) would interact with the software application 1230). In this way, the software application 1230 can be debugged in an environment which resembles post-production operation.

The processing unit 1212 comprises a memory and logic which store information frequently accessed from the memory module 1214. The computing device 1200 includes GNSS receiver 1216 which is capable of receiving a plurality of satellite signals over a wireless network. The GNSS receiver 1216 is used to track a satellite signal and henceforth compute position and velocity of a user having the computing device 1200. The GNSS receiver 1216 is analogous to the GNSS receiver 900 in connections and operation. At low satellite signal strength when a user has suddenly accelerated or very quickly accelerated to a largely different position, the GNSS receiver 1216 is able to track the satellite signal. The GNSS receiver 1216 has increased sensitivity because of the use of a register and coherent summer in the FLL and the DLL used in the GNSS receiver 1216.

It should be noted that reference throughout this specification to features, advantages, or similar language does not imply that all of the features and advantages should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Further, the described features, advantages, and characteristics of the disclosure may be combined in any suitable manner in one or more embodiments. One skilled in the relevant art will recognize that the disclosure can be practiced without one or more of the specific features or advantages of a particular embodiment. In other instances, additional features and advantages may be recognized in certain embodiments that may not be present in all embodiments of the disclosure.

One having ordinary skill in the art will understand that the present disclosure, as discussed above, may be practiced with steps and/or operations in a different order, and/or with hardware elements in configurations which are different than those which are disclosed. Therefore, although the disclosure has been described based upon these preferred embodiments, it should be appreciated that certain modifications, variations, and alternative constructions are apparent and well within the spirit and scope of the disclosure. In order to determine the metes and bounds of the disclosure, therefore, reference should be made to the appended claims.

What is claimed is:

1. A GNSS receiver comprising:
   a frequency locked loop (FLL) configured to receive a satellite signal and configured to measure a current doppler frequency of the satellite signal;
   a delay locked loop (DLL) configured to receive the satellite signal and configured to measure a current code phase delay of the satellite signal, wherein a current operating point corresponds to the current doppler frequency and the current code phase delay of the satellite signal, wherein the FLL and the DLL are centered at the current operating point;
   a processing unit coupled to the FLL and the DLL and configured to receive the satellite signal and the current operating point, and further configured to:
      compute a position of the GNSS receiver using the current operating point;
      measure a satellite signal strength at a plurality of predefined offset points from the current operating point, wherein a set of the plurality of predefined offset points are outside a tracking range of the FLL and the DLL; and
      process the satellite signal strengths at the plurality of predefined offset points and configured to re-center the FLL and the DLL to a predefined offset point of the plurality of predefined offset points, with the satellite signal strength above a predefined threshold.

2. The GNSS receiver of claim 1 further comprising a relative velocity module coupled to the FLL and the DLL and configured to measure a relative velocity estimate between a satellite and the GNSS receiver, using at least one of system time, ephemeris data, user position and motion sensor data.

3. The GNSS receiver of claim 2, wherein the FLL comprises:
   a first circuit configured to process the satellite signal and to generate a first output;
   a second circuit configured to process the satellite signal and to generate a second output;
   a subtractor configured to subtract the first output from the second output and to generate an error signal; and
   a frequency loop filter configured to generate a current doppler frequency from the error signal, wherein the current doppler frequency is positive shifted by a shifter and provided as feedback to the first circuit, and the current doppler frequency is negative shifted by a shifter and provided as feedback to the second circuit.

4. The GNSS receiver of claim 3, wherein the current doppler frequency is generated from a summer configured to receive the relative velocity estimate.

5. The GNSS receiver of claim 3, wherein the first circuit and the second circuit each comprises:
   a doppler multiplication module configured to multiply the satellite signal with a hypothesized doppler frequency signal to generate a frequency shifted signal;
   a PN multiplication module configured to multiply a PN code sequence signal with the frequency shifted signal to generate a PN wiped signal;
   a coherent integrator configured to integrate the PN wiped signal for a predefined time interval to generate a coherent accumulated data;
   a register configured to store the coherent accumulated data generated at multiple predefined time intervals;
   a coherent summer configured to sum the coherent accumulated data generated at multiple predefined time intervals; and
   a non-coherent operator configured to perform a non-coherent operation on an output of the coherent summer.

6. The GNSS receiver of claim 5, wherein the non-coherent operator in the first circuit is configured to perform a non-coherent operation on the output of the coherent summer to generate the first output, and the non-coherent summer in the second circuit is configured to perform a non-coherent operation on the output of the coherent summer to generate the second output.

7. The GNSS receiver of claim 5, wherein the first circuit comprises a doppler frequency generator configured to receive the positive shifted current doppler frequency signal to generate the hypothesized doppler frequency signal, and the second circuit comprises a doppler frequency generator configured to receive the negative shifted current doppler frequency signal to generate the hypothesized doppler frequency signal.

8. The GNSS receiver of claim 5 further comprising a satellite PN code generator configured to generate the PN code sequence signal from the current code phase delay received from the DLL and configured to provide the PN code sequence signal to the PN multiplication module in the first circuit and the PN multiplication module in the second circuit.

9. The GNSS receiver of claim 2, wherein the DLL comprises:
   a first circuit configured to process the satellite signal and to generate a first output;
   a second circuit configured to process the satellite signal and to generate a second output;
   a subtractor configured to subtract the first output from the second output and to generate an error signal; and
   a delay loop filter configured to generate a current code phase delay from the error signal; wherein the current code phase delay is positive shifted by a shifter and provided as feedback to the first circuit, and the current code phase delay is negative shifted by a shifter and provided as feedback to the second circuit.

10. The GNSS receiver of claim 9, wherein the current code phase delay is generated from a summer configured to receive the relative velocity estimate.

11. The GNSS receiver of claim 9, wherein the first circuit and the second circuit each comprises:
    a doppler multiplication module configured to multiply the satellite signal with a hypothesized doppler frequency signal to generate a frequency shifted signal;
    a PN multiplication module configured to multiply a PN code sequence signal with the frequency shifted signal to generate a PN wiped signal;
    a coherent integrator configured to integrate the PN wiped signal for a predefined time interval to generate a coherent accumulated data;
    a register configured to store the coherent accumulated data generated at multiple predefined time intervals;
    a coherent summer configured to sum the coherent accumulated data generated at multiple predefined time intervals; and
    a non-coherent operator configured to perform a non-coherent operation on an output of the coherent summer.

12. The GNSS receiver of claim 11, wherein the non-coherent operator in the first circuit is configured to perform a non-coherent operation on the output of the coherent summer to generate the first output, and the non-coherent summer in the second circuit is configured to perform a non-coherent operation on the output of the coherent summer to generate the second output.

13. The GNSS receiver of claim 11, wherein the first circuit comprises a satellite PN code generator configured to receive the positive shifted code phase delay to generate the PN code sequence signal, and the second circuit comprises a satellite PN code generator configured to receive the negative shifted code phase delay to generate the PN code sequence signal.

14. The GNSS receiver of claim 11 further comprising a doppler frequency generator configured to generate the hypothesized doppler frequency signal from the current doppler frequency signal from the FLL and configured to provide the hypothesized doppler frequency signal to the doppler multiplication module in the first circuit and the doppler multiplication module in the second circuit.

15. A method of tracking a satellite signal in a GNSS receiver comprising:
estimating a current doppler frequency from a frequency locked loop (FLL) and a current code phase delay from a delay locked loop (DLL), wherein the current doppler frequency and the current code phase delay corresponds to a current operating point;
measuring a satellite signal strength at a plurality of predefined offset points from the current operating point, wherein a set of the plurality of predefined offset points are outside a tracking range of the FLL and the DLL; and
re-centering the FLL and the DLL to a predefined offset point of the plurality of predefined offset points, with the satellite signal strength above a predefined threshold.

16. The method of claim 15 further comprising measuring a relative velocity estimate between a satellite and the GNSS receiver, using at least one of system time, ephemeris data, user position and motion sensor data and providing the relative velocity estimate to the FLL and DLL, whereby the relative velocity estimate is used by the FLL and the DLL for tracking of the satellite signal.

* * * * *